(12) United States Patent
Lee et al.

(10) Patent No.: US 12,198,647 B2
(45) Date of Patent: Jan. 14, 2025

(54) APPARATUS AND METHOD FOR DRIVING DISPLAY PANEL

(71) Applicant: LX Semicon Co., Ltd., Daejeon (KR)

(72) Inventors: Seul Gi Lee, Daejeon (KR); Yong Hee Kim, Daejeon (KR); Jun Young Park, Daejeon (KR); Jin Ho Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/392,144

(22) Filed: Dec. 21, 2023

(65) Prior Publication Data
US 2024/0233666 A1 Jul. 11, 2024

(30) Foreign Application Priority Data

Jan. 5, 2023 (KR) .................. 10-2023-0001801

(51) Int. Cl.
  *G09G 3/36* (2006.01)
  *G06T 7/90* (2017.01)
  *G09G 3/20* (2006.01)
  *G09G 3/34* (2006.01)
  *G09G 5/02* (2006.01)
  *G09G 5/10* (2006.01)

(52) U.S. Cl.
  CPC ............. *G09G 3/3607* (2013.01); *G06T 7/90* (2017.01); *G09G 3/2096* (2013.01); *G06T 2207/10024* (2013.01); *G09G 3/2003* (2013.01); *G09G 3/3413* (2013.01); *G09G 3/3611* (2013.01); *G09G 5/02* (2013.01); *G09G 5/10* (2013.01); *G09G 2320/0242* (2013.01); *G09G 2320/0666* (2013.01); *G09G 2320/08* (2013.01); *G09G 2340/06* (2013.01); *G09G 2360/16* (2013.01)

(58) Field of Classification Search
  CPC .............. G09G 3/3607; G09G 3/2096; G09G 2320/0242; G09G 2340/06; G09G 2354/00; G09G 2360/147; G09G 2360/16; G09G 2380/08; G09G 3/2003; G09G 5/02; G09G 5/10; G09G 2320/0666; G09G 3/3413; G09G 2320/08; G09G 3/3611; G09G 5/06; G06T 7/90; G06T 2207/10024
  See application file for complete search history.

(56) References Cited

U.S. PATENT DOCUMENTS 7,822,247 B2 * 10/2010 Ikemoto ................. H04N 5/262
  600/101
9,350,965 B2 * 5/2016 Lee ........................... H04N 9/68
(Continued)

OTHER PUBLICATIONS

Extended European Search Report dated Apr. 26, 2024 issued in Patent Application No. 23213201.9 (15 pages).

*Primary Examiner* — Douglas M Wilson
(74) *Attorney, Agent, or Firm* — POLSINELLI PC

(57) ABSTRACT

Disclosed herein is an apparatus for driving a display, including a main color detector configured to detect a main color of a unit pixel based on a red image signal, a green image signal, and a blue image signal, a color difference calculator configured to calculate an image signal difference among the red image signal, the green image signal, and the blue image signal, and a weight calculator configured to calculate a weight for the red image signal, the green image signal, and the blue image signal based on the image signal difference.

20 Claims, 12 Drawing Sheets

(56) References Cited

U.S. PATENT DOCUMENTS

| | | | |
|---|---|---|---|
| 9,710,932 B2* | 7/2017 | Park | G06F 3/04842 |
| 2007/0176859 A1* | 8/2007 | Cok | H10K 59/121 |
| | | | 345/76 |
| 2010/0091030 A1* | 4/2010 | Park | G09G 3/2003 |
| | | | 345/55 |
| 2015/0179136 A1 | 6/2015 | Miller et al. | |
| 2021/0020118 A1 | 1/2021 | Kang | |

* cited by examiner

US 12,198,647 B2

APPARATUS AND METHOD FOR DRIVING DISPLAY PANEL

CROSS-REFERENCE TO RELATED APPLICATIONS

This application claims the benefit of Korean Patent Application No. 10-2023-0001801, filed on Jan. 5, 2023, which is hereby incorporated by reference as if fully set forth herein.

BACKGROUND

1. Technical Field

The present disclosure relates to an apparatus and method for driving a display.

2. Description of the Related Art

Display devices such as televisions (TVs) and monitors are equipped with light sources such as light emitting diodes (LEDs) as backlights for displaying images. LED light sources tend to emit more blue light than conventional fluorescent, incandescent, or halogen lights.

Prolonged exposure to blue light may be harmful to the body as it may cause eye strain, dry eyes, and in severe cases, damage to the retina or lens of the eye. In addition, prolonged use of display devices late at night may also interfere with sleep by depressing the release of sleep-inducing hormones due to blue light.

To reduce the amount of emission of blue light, methods such as artificially reducing the blue light signal component emitted by a light source or attaching a filter that physically blocks the transmission of the blue light signal component are used.

However, with the above methods of reducing the blue light signal component, the image quality may change drastically, causing visual inconvenience to users who are continuously watching the screen.

In addition, since the image quality is changed uniformly regardless of the characteristics of the currently displayed image, it is difficult to provide optimal image quality for the user's working environment, and it is difficult to adaptively respond to changes in the input image.

Even in the case of using a physical filter, blue light is blocked by the filter unilaterally regardless of the characteristics of the image. As a result, it is difficult to provide image quality suitable for the user and difficult to appropriately cope with changes in the input image.

SUMMARY

The present disclosure is directed to an apparatus and method for driving a display that substantially address one or more problems due to limitations and disadvantages of the related art.

An object of the present disclosure devised to solve the above-mentioned problems is to provide a display driving apparatus and a display driving method for reducing the amount of emission of blue light according to a color feature of an input image.

To achieve these objects and other advantages and in accordance with the purpose of the disclosure, as embodied and broadly described herein, an apparatus for driving a display may include a main color detector configured to detect a main color of a unit pixel based on a red image signal, a green image signal, and a blue image signal, a color difference calculator configured to calculate an image signal difference among the red image signal, the green image signal, and the blue image signal, and a weight calculator configured to calculate a weight for the red image signal, the green image signal, and the blue image signal based on the image signal difference.

An apparatus and method for driving a display according to one aspect of the present disclosure may reduce blue light according to a color feature of an image, thereby reducing the impact on a user's body and preventing color degradation.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure. In the drawings.

DETAILED DESCRIPTION

Figure 1:
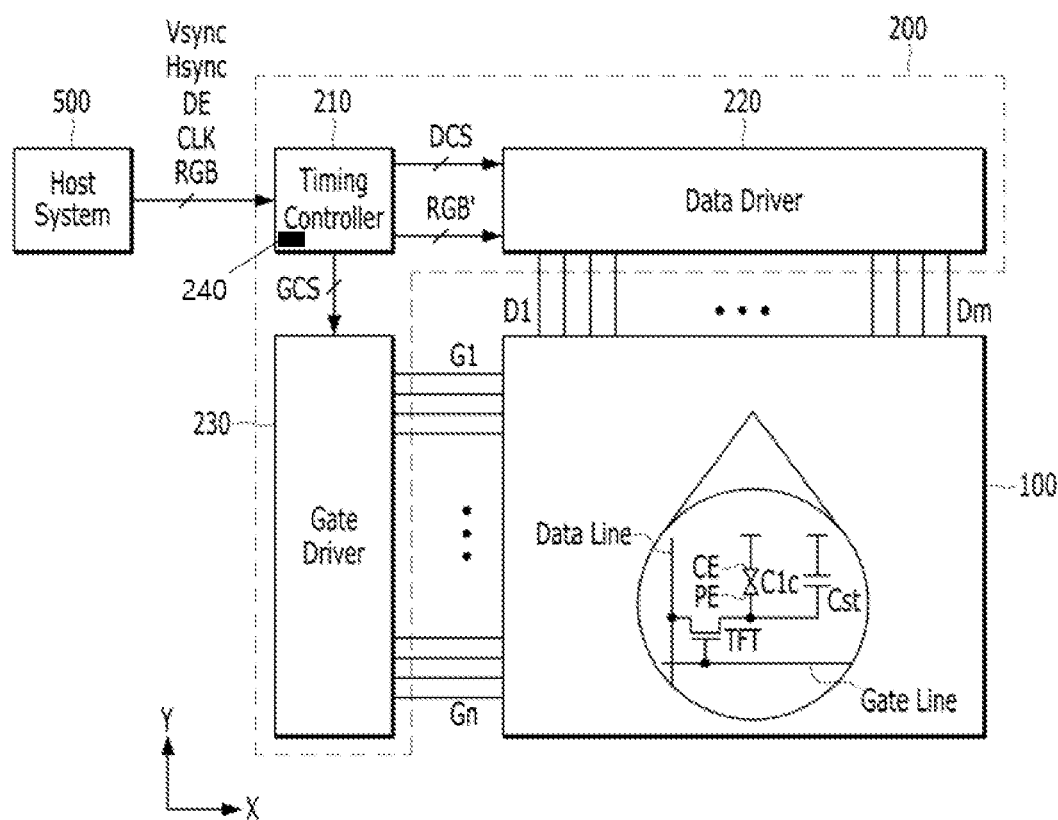
FIG. 1 is a block diagram illustrating a display device including a display driving apparatus according to an aspect of the present disclosure.

Throughout the specification, like reference numerals are used to refer to substantially the same components. In the following description, detailed descriptions of components and features known in the art may be omitted if they are not relevant to the core configuration of the present disclosure. The meanings of terms used in this specification are to be understood as follows.

The advantages and features of the present disclosure, and methods of achieving them, will become apparent from the detailed description of the embodiments, together with the accompanying drawings. However, the present disclosure is not limited to the embodiments disclosed herein and will be implemented in many different forms. The embodiments are provided merely to make the disclosure of the present disclosure thorough and to fully inform one of ordinary skill in the art to which the present disclosure belongs of the scope of the disclosure. It is to be noted that the scope of the present disclosure is defined only by the claims.

The figures, dimensions, ratios, angles, numbers of elements given in the drawings are merely illustrative and are not limiting. Like reference numerals refer to like elements throughout the specification. Further, in describing the present disclosure, descriptions of well-known technologies may be omitted to avoid obscuring the gist of the present disclosure.

As used herein, the terms "includes," "has," "comprises," and the like should not be construed as being restricted to the means listed thereafter unless specifically stated otherwise. Where an indefinite or definite article is used when referring to a singular noun e.g. "a" or "an", "the", this includes a plural of that noun unless something else is specifically stated.

Elements are to be interpreted a margin of error, even if not explicitly stated otherwise.

In describing temporal relationships, terms such as "after," "subsequent to," "next to," "before," and the like may include cases where any two events are not consecutive, unless the term "immediately" or "directly" is explicitly used.

While the terms first, second, and the like are used to describe various elements, the elements are not limited by these terms. These terms are used merely to distinguish one element from another. Accordingly, a first element referred to herein may be a second element within the technical idea of the present disclosure.

It should be understood that the term "at least one" includes all possible combinations of one or more related items. For example, the phrase "at least one of the first, second, and third items" may mean each of the first, second, or third items, as well as any possible combination of two or more of the first, second, and third items.

Features of various embodiments of the present disclosure may be partially or fully combined. As will be clearly appreciated by those skilled in the art, various interactions and operations are technically possible. Embodiments may be practiced independently of each other or in conjunction with each other.

Figure 2:
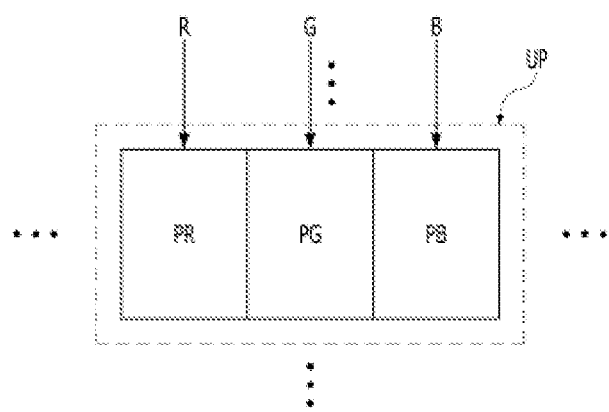
FIG. 2 is a diagram schematically illustrating a unit pixel of a display panel driven by the display driving apparatus according to the aspect of the present disclosure.

Hereinafter, a display device including a display driving apparatus according to an aspect of the present disclosure will be described in detail with reference to FIGS. 1 and 2. FIG. 1 is a block diagram illustrating a display device including a display driving apparatus according to an aspect of the present disclosure. FIG. 2 is a diagram schematically illustrating a unit pixel of a display panel driven by the display driving apparatus according to the aspect of the present disclosure.

Referring to FIG. 1, the display device according to one aspect of the present disclosure includes a display panel 100, and a display driving apparatus 200.

The display panel 100 may be implemented as a flat panel display, such as a liquid crystal display (LCD) or an organic light emitting diode (OLED) display. In other words, the display panel 100 may be of any type.

For simplicity, however, an LCD display panel will be described below as an example of the present disclosure.

The display panel 100 may include a plurality of gate lines G1 to Gn, a plurality of data lines D1 to Dm, and a plurality of pixels (not shown) to display an image of a predetermined luminance.

Each of the plurality of gate lines G1 to Gm receives a scan pulse input in a display period (DP). Each of the plurality of data lines D1 to Dn receives a data signal in the DP. The plurality of gate lines G1 to Gn and the plurality of data lines D1 to Dn are arranged on a substrate to intersect each other to define a plurality of pixel regions. Each of the plurality of pixels may include a thin-film transistor (TFT) connected to an adjacent gate line and data line, a pixel electrode (PE) and a common electrode (CE) connected to the TFT, a liquid crystal capacitor Clc arranged between the PE and the CE, and a storage capacitor Cst connected to the PE.

Further, as shown in FIG. 2, the display panel 100 may be composed of unit pixels (UP) including a red pixel PR, a green pixel PG, and a blue pixel PB. The red pixel PR, green pixel PG, and blue pixel PB included in one UP may be positioned adjacent to each other. Each of the red pixel PR, the green pixel PG, and the blue pixel PB included in the UP may receive an image signal R, G, or B for each color from the data driver 220 via a data line and display a color corresponding to the image signal R, G, B for each color.

The pixels included in the UP are not limited thereto, and the display panel 100 may be composed of UPs including a red pixel PR, a green pixel PG, a blue pixel PB, and a white pixel PW, wherein the red pixel PR, the green pixel PG, the blue pixel PB, and the white pixel PW included in one UP may be positioned adjacent to each other.

The display driving apparatus 200 may include a timing controller 210, a data driver 220, and a gate driver 230. The timing controller 210, the data driver 220, and the gate driver 230 may each be configured as an integrated circuit, but are not limited thereto. In some cases, an integrated circuit may including at least one of the timing controller 210, data driver 220, and gate driver 230. In the aspect illustrated in FIG. 1, the blue light controller 240 may be integrated into the timing controller 210. In other aspects, the blue light controller 240 can be integrated into other circuits, such as the gate driver 230, the data driver 220, the timing controller 210, and so forth.

The timing controller 210 receives various timing signals including a vertical synchronization signal Vsync, a horizontal synchronization signal Hsync, a data enable signal DE, and a clock signal CLK from the host system 500, and generates a gate control signal GCS for controlling the gate driver 230 and a data control signal DCS for controlling the data driver 220. In addition, the timing controller 210 receives an image signal RGB from an external system, converts the image signal into a form that may be processed by the data driver 220, and outputs an image signal RGB'.

The data driver 220 receives the data control signal DCS and the image signal RGB' from the timing controller 210. The data control signal DCS may include a source start pulse SSP, a source sampling clock SSC, and a source output enable signal SOE. The source start pulse controls the timing and the start of data sampling by the data driver 120. The source sampling clock SSC is a clock signal for controlling the sampling timing of data. The source output enable signal SOE controls the timing of the output.

In addition, the data driver 120 converts the received image signal RGB' into an analog data signal and supplies the data signal to the pixels through a plurality of data lines D1 to Dn.

The gate driver 230 receives the gate control signal GCS from the timing controller 210. The gate control signal GCS may include a gate start pulse GSP, a gate shift clock GSC, and a gate output enable signal. The gate driver 230 generates a gate pulse (or scan pulse) that is synchronized with the data signal through the received gate control signal GCS, shifts the generated gate pulse, and sequentially supplies the shifted gate pulse to the gate lines G1 to Gm. To this end, the gate driver 230 may include a plurality of gate drive integrated circuits (ICs) (not shown). Under control of the timing controller 210, the gate drive ICs sequentially supply the gate pulse synchronized with the data signal to the gate lines G1 through Gn to select a data line on which the data signal is input. The gate pulse swings between a gate high voltage and a gate low voltage.

According to one aspect of the present disclosure, the display driving apparatus 200 may include a blue light controller 240 (see FIG. 3) configured to regulate emission of blue light from the display panel 100. For example, at least one of the timing controller 210, the data driver 220, and the gate driver 230 described above may include the blue light controller 240. However, embodiments are not limited thereto. The blue light controller 240 may be included in a single chip that includes all of the timing controller 210, the data driver 220, and the gate driver 230, or may be included in a single chip that includes at least one of the timing controller 210, the data driver 220, and the gate driver 230.

The host system 500 converts digital image data into a format suitable for display on the display panel 100. The host system 500 transmits the converted digital image data along with timing signals Vsync, Hsync, GCS, and DCS to the timing controller 210. The host system can be implemented by a television system, a set-top box, a navigation system, a digital video disc (DVD) player, a Blu-ray player, a personal computer (PC), a home theater system, and a phone system to receive an input image.

Figure 3:
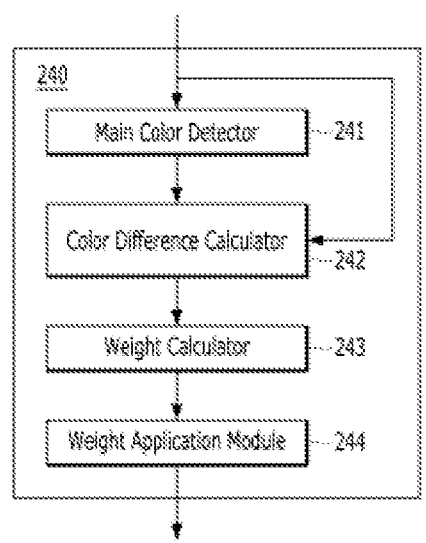
FIG. 3 is a block diagram of a blue light controller included in the display driving apparatus according to the aspect of the present disclosure.

Hereinafter, a display driving apparatus according to one aspect of the present disclosure will be described in detail with reference to FIG. 3. FIG. 3 is a block diagram of a blue light controller (e.g., the blue light controller 240 of FIGS. 1 and 3) included in the display driving apparatus according to the aspect of the present disclosure.

Referring to FIG. 3, the blue light controller 240 according to one aspect of the present disclosure may identify the characteristics of the color displayed in each UP based on the image signal RGB input to the timing controller 210 and may correct the blue image signal B according to the characteristics of the identified color to prevent color degradation.

When the blue component in Red/Green/Blue is reduced, the screen becomes yellowish, which may be referred to as color degradation. According to the conventional technology, simply reducing the blue component results in significant color degradation. On the other hand, by reducing blue according to the degree/dominance of blue as in the present disclosure, color degradation may be minimized.

Specifically, the image signal RGB input to the timing controller 210 includes a red image signal R, a green image signal G, and a blue image signal B for each UP, and the blue light controller 240 identifies the characteristics of the color to be displayed in each UP based on the red image signal R, the green image signal G, and the blue image signal B. When the main color of the UP is blue, the blue light controller 240 calculates a weight for reducing the luminance of the blue color and applies the calculated weight to the blue image signal B. To this end, the blue light controller 240 includes a main color detector 241, a color difference calculator 242, a weight calculator 243, and a weight application module 244.

The main color detector 241 detects the main color to be displayed in each UP. The main color of each UP is the color to be displayed with the greatest luminance among red, green, and blue in the UP. The main color detector 241 detects the color having the greatest luminance among red, green, and blue as the main color of the UP through the red pixel PR, green pixel PG, and blue pixel PB constituting each UP. In this case, the image signal RGB received from the host system 500 includes a red image signal R, a green image signal G, and a blue image signal B. The red image signal R, the green image signal G, and the blue image signal B are values corresponding to each color, and the main color detector 241 determines the main color of the UP based on the red image signal R, the green image signal G, and the blue image signal B. Specifically, the main color detector 241 determines the image signal having the greatest value among the red image signal R, the green image signal G, and the blue image signal B as the main color of the UP. For example, the main color detector 241 may compare the red image signal R and the green image signal G, and compare the image signal having the greater value with the blue image signal B. That is, when the red image signal R is 25, the green image signal G is 60, and the blue image signal B is 124, blue may be determined as the main color of the UP because the green image signal G is greater than the red image signal R and the blue image signal B is greater than the green image signal G.

According to one aspect of the present disclosure, when the main color detector 241 determines blue as the main color, a weight to be described later may be applied to the blue image signal B. When the main color detector 241 determines red or green as the main color, the application of the weight to the image signal may be omitted.

When the main color detector 241 determines that blue is the main color, the color difference calculator 242 calculates an image signal difference RGB_diff of the color to be displayed in each UP. The color difference calculator 242 calculates the image signal difference RGB_diff of the displayed color in each UP based on the red image signal R, the green image signal G, and the blue image signal B. Specifically, when the main color detector 241 determines that blue is the main color, the color difference calculator 242 calculates the image signal difference RGB_diff by comparing the values of the red image signal R, the green image signal G, and the blue image signal B. In particular, according to one aspect of the present disclosure, the color difference calculator 242 calculates the image signal difference RGB_diff between the image signal having the greater value between the red image signal R and the green image signal G and the blue image signal B. For example, as described above, when the red image signal R is 25, the green image signal G is 60, and the blue image signal B is 124, the color difference calculator 2421 calculates an image signal difference RGB_diff of 64 between the blue image signal B and the green image signal G that has the greater value between the red image signal R and the green image signal G.

The weight calculator 243 calculates the weight for the blue image signal B based on the image signal difference RGB_diff calculated by the color difference calculator 242. In this case, as the image signal difference RGB_diff, which is the difference between the value of the blue image signal B and the value of the red image signal R or the green image signal G increases, the weight calculated by the weight calculator 243 may increase. Specifically, the weight calculator 243 may calculate the weight based on a user-controlled constant (e.g., weight_end), an image signal maximum value DATA_MAX, and the image signal difference RGB_diff according to Equation 1, wherein the weight may be proportional to the image signal difference RGB_diff.

$$\text{weight} = \frac{(\text{weight\_end} - \text{DATA\_MAX})}{\text{DATA\_MAX}} \times \text{RGB\_diff} + \text{DATA\_MAX} \quad \text{(Equation 1)}$$

The weight application module 244 applies the weight calculated by the weight calculator 243 to the blue image signal B to output a blue corrected image signal B_w. Specifically, the weight application module 244 applies the weight to the blue image signal B according to Equation 2 below to output the corrected signal.

$$B\_w = \text{weight} \times B \quad \text{(Equation 2)}$$

Further, the weight application module 244 may apply the weight calculated by the weight calculator 243 to the red image signal R and the green image signal G, as well as the blue image signal B, to output a red corrected image signal R_w, a green corrected image signal G_w, and a blue corrected image signal G_w.

According to one aspect of the present disclosure, the blue image signal may be corrected according to the color characteristics of each UP to reduce the emission of blue light, which can disproportionately affect the vision health as compared to red and green, from the display panel 100.

Figure 4:
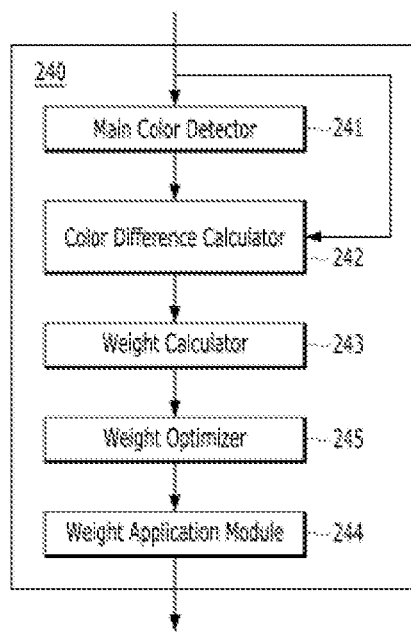
FIG. 4 is a block diagram of a blue light controller included in a display driving apparatus according to another aspect of the present disclosure.
Figure 5A:
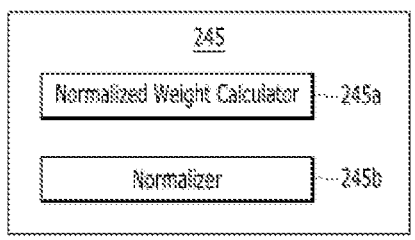
FIG. 5A is a block diagram of a weight optimizer included in the display driving apparatus according to the aspect of FIG. 4.
Figure 5B:
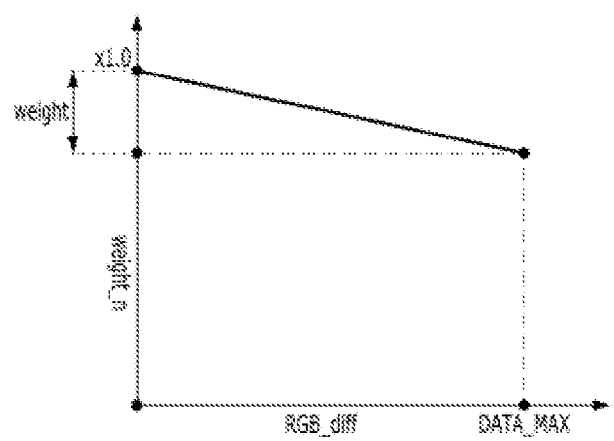
FIG. 5B is a graph depicting a weight calculated according to the aspect of FIG. 4.

Hereinafter, a display driving apparatus according to another aspect of the present disclosure will be described in detail with reference to FIGS. 4, 5A, and 5B. FIG. 4 is a block diagram of a blue light controller included in a display driving apparatus according to another aspect of the present disclosure. FIG. 5A is a block diagram of a weight optimizer included in the display driving apparatus according to the aspect of FIG. 4, and FIG. 5B is a graph depicting a weight calculated according to the aspect of FIG. 4.

According to another aspect of the present disclosure, the weight calculator 243 calculates a weight for the blue image signal B based on the image signal difference RGB_diff calculated by the color difference calculator 231. As the image signal difference RGB_diff, which is the difference between the value of the blue image signal B and the value of the red image signal R or the green image signal G, increases, the weight calculated by the weight calculator 243 may increase. Specifically, the weight calculator 243 may calculate the weight based on the weight proportionality constant weight_end predetermined by the user (e.g., input by a user control), the image signal maximum value DATA_MAX, and the image signal difference RGB_diff, as described in Equation 3. In this case, the weight may be proportional to the image signal difference RGB_diff.

$$\text{weight} = \frac{\text{weight\_end}}{\text{DATA\_MAX}} \times \text{RGB\_diff} \quad \text{(Equation 3)}$$

According to another aspect of the present disclosure, as shown in FIG. 4, the blue light controller 240 further includes a weight optimizer 245 to minimize color degradation of the display panel 100.

The weight optimizer 245 may include a normalization weight calculator 245a, as shown in FIG. 5A. The normalization weight calculator 245a calculates a normalization weight weight_n based on the weight calculated by the weight calculator 243 and the maximum value of the blue image signal B in the corresponding frame. In one aspect, the normalization weight calculator 245a calculates the maximum value frame_max_B among the blue image signals B to be displayed in the corresponding frame on the display panel 100, and applies the maximum value frame_max_B of the blue image signals B in the corresponding frame, the weight calculated by the weight calculator 243, and the image signal maximum value DATA_MAX as described Equation 4 below to calculate the normalization weight weight_n.

$$\text{weight} = \frac{\text{DATA}_{MAX} - \text{weight}}{\text{frame\_max\_B}} \quad \text{(Equation 4)}$$

In addition, the weight optimizer 245 may include a normalizer 245b, as shown in FIG. 5A. The normalizer 245b may calculate the maximum value frame_max_B and minimum value of the blue image signals B to be displayed in the corresponding frame to normalize the blue image signals B included in the corresponding frame.

Since the display driving apparatus according to another aspect of the present disclosure calculates the normalization weight weight_n and normalizes the blue image signals B included in the corresponding frame based on the maximum and minimum values in the frame in which each UP is displayed, the maximum value frame_max_B and minimum value in the frame and the calculated normalization weight weight_n are applicable to the blue image signals B included in a frame following the frame.

According to another aspect of the present disclosure, the weight application module 244 applies the normalization weight weight_n calculated by the weight optimizer 245 to the blue image signals B and outputs the result. Specifically, the weight application module 244 applies the normalized weight weight_n to the blue image signals B similar to Equation 2.

For example, when the weight application module 244 applies the normalization weight weight_n to the blue image signal B, as shown in FIG. 5b, the output blue image signal B_w obtained by applying the normalization weight weight_n may be reduced by a greater value as the value of the input blue image signal B increases.

Further, the weight application module 244 may apply the normalization weight weight_n calculated by the weight optimizer 245 to the red image signal R and the green image signal G as well as the blue image signal B to output a red corrected image signal R_w, a green corrected image signal G_w, and a blue corrected image signal G_w. For example, the normalization weight weight_n can correspond to a gain that scales the red image signal R and the green image signal G.

According to another aspect of the present disclosure, by correcting the blue image signal B according to the color characteristics of each UP, the emission of blue light, which may affect the user's vision, from the display panel 100 may be reduced while preventing color degradation. For example, blue light increases a user's eye strain, which can negatively impact their vision health.

Hereinafter, a display driving apparatus according to yet another aspect of the present disclosure will be described in detail with reference to FIGS. 6, 7A, and 7B.

Figure 6:
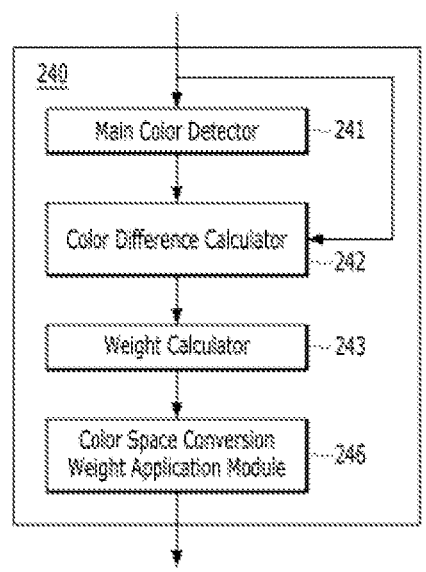
FIG. 6 is a block diagram of a blue light controller included in a display driving apparatus according to yet another aspect of the present disclosure.

FIG. 6 is a block diagram of a blue light controller included in a display driving apparatus according to yet another aspect of the present disclosure. FIG. 7A is a block diagram of a color space conversion weight application module included in the display driving apparatus according to the aspect of FIG. 6, and FIG. 7B is a graph depicting weights calculated according to the aspect of FIG. 6.

According to this aspect of the present disclosure, the blue light controller 240 further includes a color space conversion weight application module 246 to minimize color degradation of the display panel 100, as shown in FIG. 6.

According to this aspect, the color space conversion weight application module 246 may convert an image signal for the RGB color space into an image signal for the YCbCr color space, calculate a weight, and convert the converted image signal back into an image signal for the RGB color space by applying the weight, thereby minimizing the color degradation of the display panel 100.

Controlling blue by converting the color space to the YCbCr color space is one of the techniques of De-Blue Light. Blue can be controlled in the RGB space adaptively (according to the degree/dominance of blue), or saturation can be controlled in the YCbCr space adaptively (according to the degree/dominance of blue). Controlling the saturation in YCbCR is not a direct control of the blue. However, since the saturation is controlled, the screen may be prevented from becoming yellowish as the saturation is lowered.

Figure 7A:
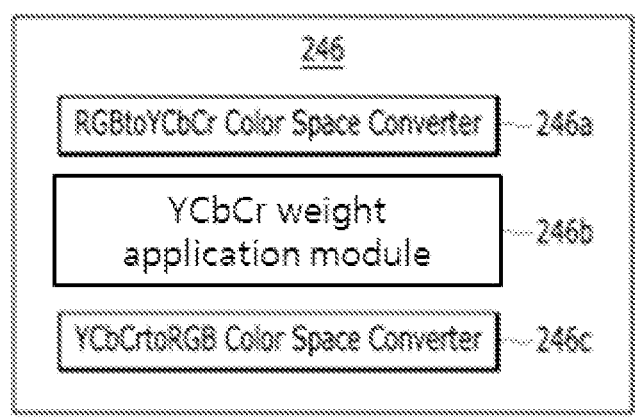
FIG. 7A is a block diagram of a color space conversion weight application module included in the display driving apparatus according to the aspect of FIG. 6.

To this end, as shown in FIG. 7A, the color space conversion weight application module 246 may include an RGBtoYCbCr color space conversion module 246a, a YCbCr weight application module 246b, and a YCbCrtoRGB color space conversion module 246c.

The RGBtoYCbCr color space conversion module 246a converts an image signal for the RGB color space to an image signal for the YCbCr color space. Specifically, the RGBtoYCbCr color space conversion module 246a converts the red image signal R, green image signal G, and blue image signal B of a UP, which are image signals for the RGB color space, into a Y image signal Y, a Cb image signal Cb, and a Cr image signal Cr, which are image signals for the YCbCr color space.

The YCbCr weight application module 246b applies weights calculated by the weight calculator 243 in Equations 5 and 5 to the Cb image signal Cb and the Cr image signal Cr among the Y image signal Y, Cb image signal Cb and Cr image signal Cr, which are image signals for the YCbCr color space to generate a weighted Cb corrected image signal Cb_w and a weighted Cr corrected image signal Cr_w.

$$Cb\_w = weight \times Cb \quad \text{(Equation 5)}$$

$$Cr\_w = weight \times Cr \quad \text{(Equation 6)}$$

Figure 7B:
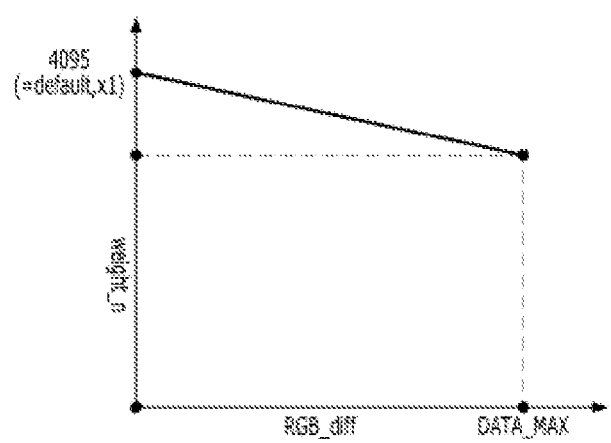
FIG. 7B is a graph depicting weights calculated according to the aspect of FIG. 6.

Here, the values of the weights may decrease as the color difference RGB_diff increases as shown in FIG. 7B, thereby preventing color degradation while reducing the emission of blue light, which may affect the user's vision, from the display panel 100.

The YCbCrtoRGB color space conversion module 246c converts the image signals for the YCbCr color space back into an image signal for the RGB color space. Specifically, the YCbCrtoRGB color space converter 245e converts the Y image signal Y, the weighted Cb corrected image signal Cb_w, and the weighted Cr corrected image signal Cr_w into a red corrected image signal R_w, a green corrected image signal G_w, and a blue corrected image signal B_w and outputs the converted signals.

According to this aspect, the red image signal R, the green image signal G, and the blue image signal B may be corrected according to the color characteristics of each UP to prevent color degradation while reducing the emission of blue light, which may affect the user's body, from the display panel 100.

Figure 8:
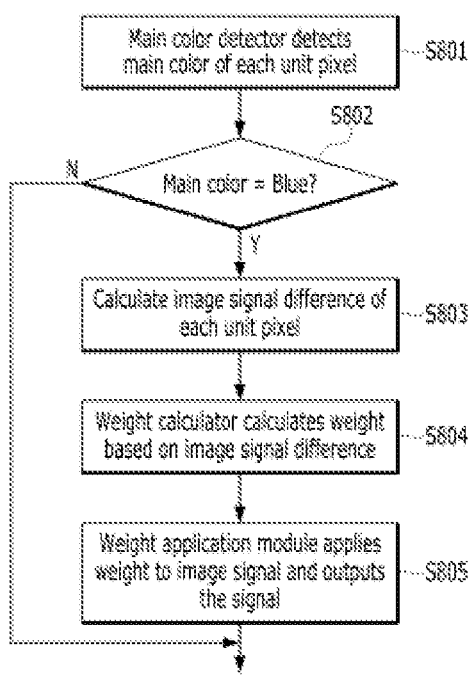
FIG. 8 is a flowchart of a method of driving a display according to one aspect of the present disclosure.

Hereinafter, a method of driving a display according to one aspect of the present disclosure will be described in detail with reference to FIG. 8. FIG. 8 is a flowchart of a method of driving a display according to one aspect of the present disclosure.

According to a display driving method according to one aspect of the present disclosure, a characteristic of a color displayed in each UP may be identified based on an input image signal RGB, and a color degradation may be prevented while correcting a luminance of blue according to the characteristic of the identified color.

Referring to FIG. 8, the main color detector 241 first detects the main color of each UP at block S801. The main color of each UP is the color represented by the greatest luminance in the UP. Specifically, the main color detector 241 detects the color having the greatest value among the red image signal R, the green image signal G, and the blue image signal B as the main color of the UP.

Then, the color difference calculator 242 determines whether the color determined as the main color by the main color detector 241 is blue at block S802. When the main color detector 241 determines blue as the main color, the color difference calculator 242 calculates the image signal difference RGB_diff of each UP at block S803. Specifically, the color difference calculator 242 calculates the image signal difference RGB_diff of the color displayed in each UP based on the red image signal R, the green image signal G, and the blue image signal B. In particular, according to one aspect of the present disclosure, the color difference calculator 242 calculates the image signal difference RGB_diff between the image signal of the color having the greater value between the red image signal R and the green image signal G and the blue image signal B.

On the other hand, when the main color detector 241 does not determine blue as the main color, the correction of the red image signal R, the green image signal G, and the blue image signal B may be omitted.

Then, the weight calculator 243 calculates the weight for the blue image signal B based on the image signal difference RGB_diff calculated by the color difference calculator 231 at block S804. Specifically, as described in Equation 1 above, the weight calculator 243 may calculate the weight based on the weight proportionality constant weight_end predetermined by the user, the image signal maximum value DATA_MAX, and the image signal difference RGB_diff, wherein the weight may be proportional to the image signal difference RGB_diff.

Then, the weight application module 244 applies the weight calculated by the weight calculator 243 to the blue image signal B and outputs the result at block S805. Specifically, the weight application module 244 applies the weight to the blue image signal B to output a blue corrected image signal B_w, as shown in Equation 2 above. Further, the weight application module 244 may apply the weight calculated by the weight calculator 243 to the red image signal R and the green image signal G in addition to the blue image signal B to output a red corrected image signal R_w, a green corrected image signal G_w, and a blue corrected image signal B_w.

Hereinafter, a method of driving a display according to another aspect of the present disclosure will be described in detail with reference to FIGS. 9 and 10.

Figure 9:
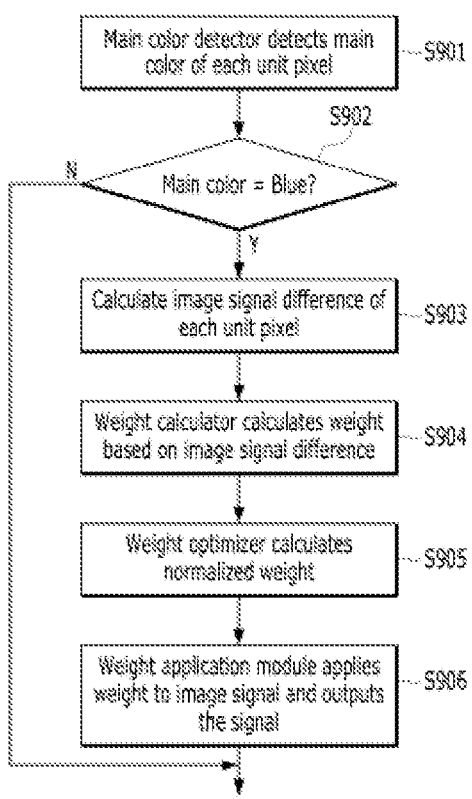
FIG. 9 is a flowchart of a method of driving a display according to another aspect of the present disclosure.
Figure 10:
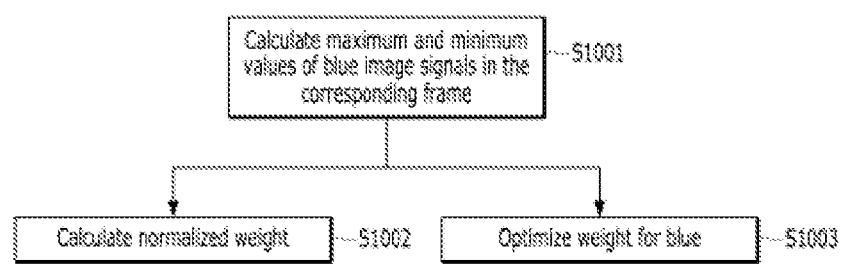
FIG. 10 is a flowchart of a method of optimizing weights according to another aspect of the present disclosure.

FIG. 9 is a flowchart of a method of driving a display according to another aspect of the present disclosure, and FIG. 10 is a flowchart of a method of optimizing weights according to another aspect of the present disclosure.

Referring to FIG. 9, the main color detector 241 first detects the main color of each UP at block S901. The main color of each UP is the color represented by the greatest luminance in the UP. Specifically, the main color detector 241 detects the color having the greatest value among the red image signal R, the green image signal G, and the blue image signal B as the main color of the UP.

Then, the color difference calculator 242 determines whether the main color is blue at block S902. When the main color detector 241 determines blue as the main color, the color difference calculator 242 calculates the image signal difference RGB_diff of each UP at block S903. Specifically, the color difference calculator 242 calculates the image signal difference RGB_diff of the color displayed in each UP based on the red image signal R, the green image signal G, and the blue image signal B. In particular, according to one aspect of the present disclosure, the color difference calculator 242 calculates the image signal difference RGB_diff between the image signal of the color having the greater value between the red image signal R and the green image signal G and the blue image signal B.

On the other hand, when the main color detector 241 does not determine blue as the main color, the correction of the red image signal R, the green image signal G, and the blue image signal B may be omitted.

Then, the weight calculator 243 calculates the weight for the blue image signal B based on the image signal difference RGB_diff calculated by the color difference calculator 231 at block S904. Specifically, as described in Equation 3 above, the weight calculator 243 may calculate the weight based on the weight proportionality constant weight_end predetermined by the user (e.g., a user controlled constant that is set by the user during operation), the image signal maximum value DATA_MAX, and the image signal difference RGB_diff, wherein the weight may be proportional to the image signal difference RGB_diff.

Then, the weight optimizer 245 calculates a normalization weight weight_n based on the weight calculated by the weight calculator 243 and the maximum value of the blue image signal B in the corresponding frame at block S905. Specifically, as shown in FIG. 10, the weight optimizer 245 calculates the maximum value frame_max_B and minimum value among the blue image signals B to be displayed in the corresponding frame on the display panel 100 at block S1001, and applies the calculated maximum value frame_max_B of the blue image signals B in the corresponding frame, the weight calculated by the weight calculator 243, and the image signal maximum value DATA_MAX based on Equation 4 described above to calculate the normalization weight weight_n at block S1002. Further, the normalization weight optimizer 245 may normalize the blue image signals B included in the corresponding frame based on the maximum value frame_max_B and minimum value of the blue image signals B to be displayed in the corresponding frame at block S1003.

Then, the weight application module 244 applies the normalization weight weight_n calculated by the weight optimizer 245 to the blue image signal B and outputs the result at block S906. Specifically, the weight application module 244 applies the normalization weight weight_n to the blue image signal B to output a blue corrected image signal B_w, as shown in Equation 2 above. The weight application module 244 may also apply the normalization weight weight_n to the blue image signals (B) of the corresponding frame normalized by the weight optimizer 245. Further, the weight application module 244 may apply the normalization weight weight_n calculated by the weight optimizer 245 to the red image signal R and the green image signal G in addition to the blue image signal B to output a red corrected image signal R_w, a green corrected image signal G_w, and a blue corrected image signal B_w.

Figure 11:
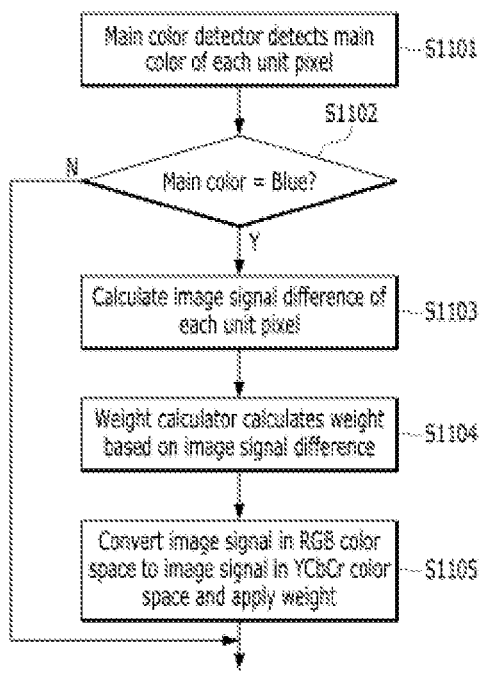
FIG. 11 is a flowchart of a method of driving a display according to yet another aspect of the present disclosure.
Figure 12:
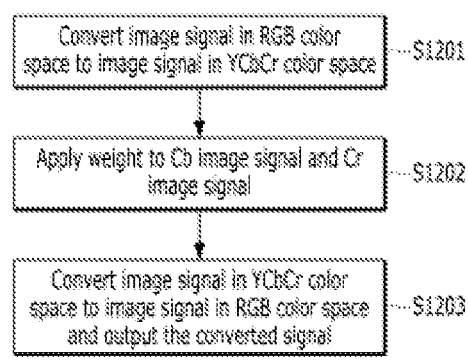
FIG. 12 is a flowchart of a method of optimizing weights according to yet another aspect of the present disclosure.

Referring now to FIGS. 11 and 12, a method of driving a display according to yet another aspect of the present disclosure will be described in detail.

FIG. 11 is a flowchart of a method of driving a display according to yet another aspect of the present disclosure, and FIG. 12 is a flowchart of a method of optimizing weights according to yet another aspect of the present disclosures.

Referring to FIG. 11, the main color detector 241 first detects the main color of each UP at block S1101. The main color of each UP is the color represented by the greatest luminance in the UP. Specifically, the main color detector 241 detects the color having the greatest value among the red image signal R, the green image signal G, and the blue image signal B as the main color of the UP.

Then, the color difference calculator 242 determines whether the color determined as the main color by the main color detector 241 is blue at block S1102. When the main color detector 241 determines blue as the main color, the color difference calculator 242 calculates the image signal difference RGB_diff of each UP at block S1103. Specifically, the color difference calculator 242 calculates the image signal difference RGB_diff of the color displayed in each UP based on the red image signal R, the green image signal G, and the blue image signal B. In particular, according to one aspect of the present disclosure, the color difference calculator 242 calculates the image signal difference RGB_diff between the image signal of the color having the greater value between the red image signal R and the green image signal G and the blue image signal B.

On the other hand, when the main color detector 241 does not determine blue as the main color, the correction of the red image signal R, the green image signal G, and the blue image signal B may be omitted.

Then, the weight calculator 243 calculates the weight for the blue image signal B based on the image signal difference RGB_diff calculated by the color difference calculator 231 at block S1104. Specifically, as described in Equation 1 above, the weight calculator 243 may calculate the weight based on the weight proportionality constant weight_end predetermined by the user, the image signal maximum value DATA_MAX, and the image signal difference RGB_diff, wherein the weight may be proportional to the image signal difference RGB_diff.

Then, the color space conversion weight application module 246 converts an image signal for the RGB color space into an image signal for the YCbCr color space, and converts the converted image signal back into an image signal for the RGB color space by applying a weight to provide an output at block S1105. Specifically, as shown in FIG. 12, the color space conversion weight application module 246 converts an image signal for the RGB color space to an image signal for the YCbCr color space at block S1201. Specifically, the color space conversion weight application module 246 converts the red image signal R, green image signal G, and blue image signal B of a UP, which are image signals for the RGB color space, into a Y image signal Y, a Cb image signal Cb, and a Cr image signal Cr, which are image signals for the YCbCr color space.

Then, the color space conversion weight application module 246 applies a weight to the Cb image signal Cb and the Cr image signal Cr, which are image signals for the YCbCr color space at block S1202. Specifically, the color space conversion weight application module 246 applies a weight calculated by the weight calculator 243 to the Cb image signal Cb and the Cr image signal Cr among the Y image signal Y, the Cb image signal Cb, and the Cr image signal Cr, which are image signals for the YCbCr color space, as shown in Equation 5 and Equation 6 above, and generates a weighted Cb corrected image signal Cb_w and a weighted Cr corrected image signal Cr_w.

Then, the color space conversion weight application module 246 converts the image signals for the YCbCr color space into image signals for the RGB color space at block S1203. Specifically, the color space conversion weight application module 246 converts the Y image signal Y, the weighted Cb corrected image signal Cb_w, and the weighted Cr corrected image signal Cr_w into a red corrected image signal R_w, a green corrected image signal G_w, and a blue corrected image signal B_w as outputs.

According to this aspect, the red image signal R, the green image signal G, and the blue image signal B may be corrected according to the color characteristics of each UP, thereby reducing the emission of blue light, which may affect the user's body, from the display panel 100 while preventing color degradation.

It will be appreciated by those skilled in the art to which the present disclosure belongs that the disclosure described above may be practiced in other specific forms without altering its technical ideas or essential features.

Further, the methods described herein may be implemented, at least in part, using one or more computer programs or components. The components may be provided as a set of computer instructions on a computer-readable medium including volatile and non-volatile memories or on a machine-readable medium. The instructions may be provided as software or firmware and may be implemented, in whole or in part, in hardware configurations such as application specific integrated circuits (ASICs), functional programmable gate arrays (FPGAs), digital signal processors (DSPs), or other similar devices. The instructions may be configured to be executed by one or more processors or other hardware components, wherein the processors or other hardware components perform or are enabled to perform all or a part of the methods and procedures disclosed herein when executing the above set of computer instructions.

It should therefore be understood that the embodiments described above are exemplary and non-limiting in all respects. The scope of the present disclosure is defined by the appended claims, rather than by the detailed description above, and should be construed to cover all modifications or variations derived from the meaning and scope of the appended claims and the equivalents thereof.

What is claimed is:

1. An apparatus for driving a display, comprising:
   a main color detector configured to:
   detect a main color of a unit pixel based on an image signal associated with a single frame, the image signal comprising a red image signal, a green image signal, and a blue image signal; and identify a maximum blue value associated with a pixel of the single frame from the red image signal, the green image signal, and the blue image signal;
   a color difference calculator configured to calculate an image signal difference among the red image signal, the green image signal, and the blue image signal; and
   a weight calculator configured to: calculate a weight for the red image signal, the green image signal, and the blue image signal based on the image signal difference;
   calculate a gain based on the weight and the maximum blue value; and
   modify the single frame based on the gain.

2. The apparatus of claim 1, wherein the main color detector is configured to detect a color of the image signal having a greatest value among the red image signal, the green image signal, and the blue image signal as the main color.

3. The apparatus of claim 1, wherein, when the main color detector is configured to detect blue as the main color, the color difference calculator is configured to calculate the image signal difference between the blue image signal and a greater value between the red image signal and the green image signal.

4. The apparatus of claim 3, wherein the weight calculator is configured to calculate the weight for the blue image signal based on the image signal difference.

5. The apparatus of claim 4, wherein the weight calculator is configured to calculate the weight based on a user-controlled constant, a maximum value of the image signal, and the image signal difference.

6. The apparatus of claim 4, further comprising:
   a weight application module configured to output at least one of a blue corrected image signal, a red corrected image signal, or a green corrected image signal by applying the weight to at least one of the blue image signal, the red image signal, or the green image signal based on the blue corrected image signal scaled based on the weight.

7. The apparatus of claim 1, wherein the weight calculator calculates the weight based a user-controlled constant that is normalized based on an image signal maximum value and scaled based on the image signal difference.

8. The apparatus of claim 7, further comprising:
   a weight optimizer configured to calculate a normalization weight based on a difference between a maximum value of the blue image signal and the weight and normalized by the maximum value; and
   a weight application module configured to apply the normalization weight to at least one of the blue image signal, the red image signal, or the green image signal.

9. The apparatus of claim 7, further comprising:
   a weight optimizer configured to:
   calculate a maximum value and a minimum value of the blue image signal, and
   normalize the blue image signal in which the unit pixel is displayed based on the maximum value and the minimum value.

10. The apparatus of claim 5, further comprising:
a color space conversion weight application module configured to:
convert the red image signal, the green image signal, and the blue image signal of an first color space into a luminance component, a blue chroma component, and a red chroma component for a second color space;
apply the weight to the blue chroma component and the red chroma component; and
convert the luminance component, the weighted blue chroma component, and weighted red chroma component into a red corrected image signal, a green corrected image signal, and a blue corrected image signal, the red corrected image signal, the green corrected image signal, and the blue corrected image signal being image signals for the first color space.

11. The apparatus of claim 5, wherein
the weight calculator calculates the weight based on:
weight=(weight_end−DATA_MAX)/DATA_MAX× RGB_diff+DATA_MAX, where weight_end is the user-controlled constant, RGB_diff is the image signal difference, and the DATA_MAX is an image signal maximum value.

12. A method of driving a display, the method comprising:
detecting a main color of a unit pixel of a plurality of unit pixels from an image signal having a greatest value among a red image signal, a green image signal, and a blue image signal;
calculating an image signal difference of the plurality of unit pixels based on the red image signal, the green image signal, and the blue image signal; and
calculating a weight based on the image signal difference.

13. The method of claim 12, wherein the calculating of the image signal difference comprises:
based on detecting blue as the main color, calculating the image signal difference between the blue image signal and a greater value between the red image signal and the green image signal.

14. The method of claim 12, wherein the calculating of the weight comprises:
calculating the weight of the blue image signal based the image signal difference between the blue image signal and a greater value between the red image signal and the green image signal and the blue image signal.

15. The method of claim 14, wherein the weight is based on a user-controlled constant, the image signal difference, and an image signal maximum value.

16. The method of claim 15, wherein the calculating of the weight comprises:
applying the weight to the blue image signal,
wherein the applying of the weight comprises:
outputting at least one of a blue corrected image signal, a red corrected image signal, or a green corrected image signal by applying the weight to at least one of the blue image signal, the red image signal, or the green image signal.

17. The method of claim 14, wherein, in the calculating of the weight, the weight is calculated based a user-controlled constant scaled that is normalized based on a maximum value and scaled based on the image signal difference.

18. The method of claim 17, further comprising:
calculating a normalization weight based on a difference between a maximum value of the blue image signal and the weight and normalized by the maximum value; and
applying the normalization weight to at least one of the blue image signal, the red image signal, or the green image signal and outputting at least one of a blue corrected image signal, a red corrected image signal, or a green corrected image signal.

19. The method of claim 15, further comprising:
converting the red image signal, the green image signal, and the blue image signal for a first color space into luminance component, a blue chroma component, and a red chroma component for a second color space;
applying the weight to the blue chroma component and the red chroma component; and
converting the luminance component, the weighted blue chroma component, and weighted red chroma component into a red corrected image signal, a green corrected image signal, and a blue corrected image signal, the red corrected image signal, the green corrected image signal, and the blue corrected image signal being image signals for the first color space.

20. The method of claim 14, wherein the weight is calculated based on:

$$weight = \frac{(weight\_end - DATA\_MAX)}{DATA\_MAX} \times RGB\_diff + DATA\_MAX,$$

where weight_end is the user-controlled constant, RGB_diff is the image signal difference, and the DATA_MAX is the image signal maximum value.

* * * * *